United States Patent [19]

Jones

[11] 4,249,707
[45] Feb. 10, 1981

[54] LEADER DISPENSER

[76] Inventor: Cyril W. Jones, 3725 Chinden Blvd., Boise, Id. 83704

[21] Appl. No.: 120,730

[22] Filed: Feb. 11, 1980

[51] Int. Cl.³ .................... B75H 75/36; A01K 97/06
[52] U.S. Cl. ............................... 242/85.1; 43/57.5 R
[58] Field of Search ............................... 242/85.1, 96; 43/57.5 R, 57.5 A

[56] References Cited

U.S. PATENT DOCUMENTS

| 1,454,050 | 5/1923 | Gruenhagen | 242/85.1 |
| 1,676,119 | 7/1928 | Tipil | 242/85.1 |
| 3,033,487 | 5/1962 | Walker | 242/85.1 |
| 4,006,554 | 2/1977 | Tice | 43/57.5 R |

Primary Examiner—Edward J. McCarthy
Attorney, Agent, or Firm—W. Edward Johansen

[57] ABSTRACT

The present invention is an improved leader dispenser for storing and dispensing leader material which includes an elongated, substantially rectangular member for receiving the leader material which is wound onto the elongated, substantially rectangular member. The elongated, substantially rectangular member has a first rounded end and a second rounded end, each of which rounded ends is in the shape of a double sided flange having a thin sidewall and a thick sidewall. The improved leader dispenser also includes a spring which is embedded within the thick sidewall of the first rounded end and which is disposed orthogonally to the elongated, substantially rectangular member so that the end of the leader material may be secured within the coil of the spring. The improved leader dispenser further includes a longitudinal cavity within the elongated, substantially rectangular member on one of its sides and a protuberance, which is matched to the longitudinal cavity and disposed on the opposite side of the elongated, substantially rectangular member, so that the improved leader dispenser may be coupled to another identical improved leader dispenser thereby achieving a modular leader dispenser for a variety of leader material of different sizes.

5 Claims, 6 Drawing Figures

LEADER DISPENSER

BACKGROUND OF THE INVENTION

1. Field of the Invention

The present invention relates to fishing apparatus and more particularly to a device for storing and dispensing leader material.

2. Description of the Prior Art

U.S. Pat. No. 4,052,810, entitled Snelled Hook Holder, issued to Curtis A. Stevenson on Oct. 11, 1977, teaches a snelled hook holder which includes a hook penetratable member for releasably receiving the point of the hook, a spacer member in the form of a bent wire and a coil spring mounted transversely of the hook penetratable member for receiving and holding the leader in tension between adjacent coils of the spring.

U.S. Pat. No. 4,040,202, entitled Fishing Tackle Storage Case, issued to Richard M. Wille on Aug. 9, 1977, teaches a generally open frame member which has a series of coil springs attached by their ends to threaded studs on the interior of the frame. The opposite free ends of the springs are each opened for the attachment of one end of a lure, the other end of which is hooked, under tension of the spring, to a spaced fixed attachment means or to an oppositely mounted spring. Each frame is adapted to be attached to one or more identical frames by demountable hinges and the two outermost frames are provided with covers to give a completely enclosed storage case.

U.S. Pat. No. 4,005,541, entitled Fishing Leader Tender, issued to Robert Brent Henrichsen on Feb. 1, 1977, teaches a fishing leader tender which has an elongated base and a pair of hook engaging blocks attached near one end of said base and tension spring means attached near the other end. The fishing leader tender is particularly useful for holding ganged hooks wherein more than one hook is tied to one leader. The base is flat and preferably rigid with a clip attached to the spring means to engage the loop of the leader. The blocks have soft hook engaging means, such as cork, on an edge opposite the spring. The hook engaging blocks are preferably movable longitudinally so that they may be adjusted to hold a particular length of leader. The leader tender may be hinged in the center to fold more compactly and may be incorporated into a fishing box, either externally or internally. The base may be equipped with a pair of elongated legs and a rod holder to form a rod tender.

U.S. Pat. No. 3,564,755, entitled Snelled Fishhook Holder, issued to Harry J. Lindgren on Feb. 23, 1971, teaches a snelled fishhook holder which includes a block of material having a plurality of positions in one end to receive the barbed end of a fishhook. The block of material is substantially rectangular in shape and has a plurality of guide slots in the end opposite the fishhook positions, to receive the fishhook leaders extending therethrough. A plurality of lateral grooves is provided across the one end juxtaposed to the positions for receiving the fishhooks and corresponding guide slots on the opposite end of the block to receive knots in leaders extending around the block. Fishhook positions may be spaced along the flat surface of the block to accommodate other lengths of leader.

U.S. Pat. No. 4,006,554, entitled Fishhook Remover and Leader Storage Device, issued to Richard P. Tice and Donald L. Galbraith on Feb. 8, 1977, teaches a reusable storage device for a fishhook and attached leader which includes an elongated body formed of a semirigid material with longitudinally spaced oppositely facing grooves at opposed ends thereof. A hole is formed through the body to receive a hook shank. The hook may be placed through the hole and thereby engaged with the device while the attached leader is wrapped about the body utilizing the opposed grooves for storage purposes. A curved slit is provided through the body extending from one longitudinal edge toward an opposed edge for receiving and securely holding the leader end. One groove may be utilized along with the remainder of the body as a device for assisting in removing a hook from the mouth or throat of a fish.

U.S. Pat. No. 4,030,228, entitled Cartridge for Fishing Flies and Leaders, issued to Elvin J. Schaefers on June 21, 1977 teaches a cartridge for separate attachment and storage of a plurality of fishing flies with leaders attached to them, and for winding the leaders separately upon the cartridge. The cartridge includes an open area centrally located within the cartridge for the separate attachment and storage of the flies, and a plurality of side-by-side tracks for winding leaders attached to the flies upon the cartridge and a device by which the leaders are attached to each of the flies may be brought into position to be wound separately on the side-by-side tracks which form the periphery of the cartridge. Each of the leaders is wound separately upon a separate one of the tracks to prevent entanglement of the leaders. The cartridge also includes a device for separately securing the ends of the leaders upon the cartridge after the leaders have been wound thereon, and a case for the cartridge.

SUMMARY OF THE INVENTION

In view of the factors and conditions characteristic of the prior art it is a primary object of the present invention to provide an improved leader dispenser which has an embedded spring which provides positive retention of the leader end and allows winding of the leader without interference.

It is another object of the present invention to provide a plurality of identical improved leader dispensers which snap together in order to form a modular fishing leader dispenser for different sizes of leaders.

It is still another object of the present invention to provide an improved leader dispenser which is an elongated member and which is not a circular member thereby allowing the improved leader dispenser to be more compactly stored in the fishing jacket of the fisherman.

In accordance with an embodiment of the present invention, an improved leader dispenser for storing and dispensing leader material which includes an elongated, substantially rectangular member for receiving the leader material which is wound onto the elongated, substantially rectangular member is disclosed. The elongated, substantially rectangular member has a first rounded end and a second rounded end, each of which rounded ends is in the shape of a double sided flange having a thin sidewall and a thick sidewall. The improved leader dispenser also includes a spring which is embedded within the thick sidewall of the first rounded end and which is disposed orthogonally to the elongated, substantially rectangular member so that the end of the leader material may be secured within the coil of the spring. The improved leader dispenser further includes a longitudinal cavity within the elongated, substantially rectangular member in one of its sides and a protuberance, which is matched to the longitudinal cavity and disposed on the opposite side of the elongated, substantially rectangular member, so that the improved leader dispenser may be coupled to another identical improved leader dispenser thereby achieving a modular leader dispenser for a variety of leader material of different sizes.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
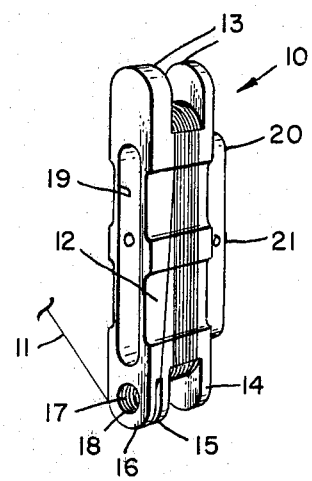
FIG. 1 is a perspective drawing of an improved leader dispenser.

In order to best understand the present invention it is necessary to read the following description of its preferred embodiment in conjunction with referring to the accompanying drawing. Referring to FIG. 1 an improved leader 10 for storing and dispensing leader material 11 includes an oblong core 12 on which the leader material 11 is wound and a double-sided oblong flange 13 which has a thin sidewall 14 and a thick sidewall 15 having a slot 16 which is disposed parallel thereto at one end. The improved leader dispenser 10 further includes a spring 17 which is embedded within the hole 18 disposed in the thick sidewall 15 of the double-sided flange 13 at the end with the slot 16. The spring 17 secures one of the ends of the leader material 11 which is wound onto the oblong core 12 of the improved leader dispenser 10. The spring 17 provides positive retention of the leader end so that leader material 11 will not get tangled up.

Figure 2:
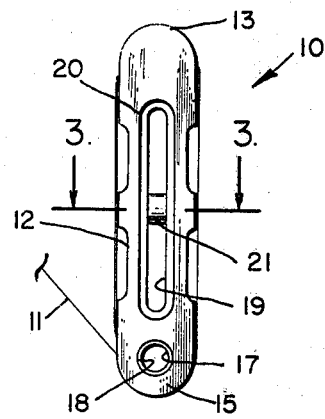
FIG. 2 is a left side elevational view of the improved leader dispenser of FIG. 1.
Figure 4:
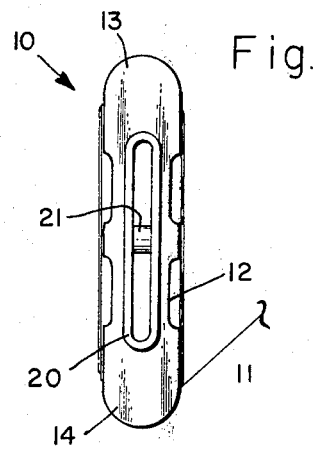
FIG. 4 is a right side elevational view of the improved leader dispenser of FIG. 1.
Figure 3:
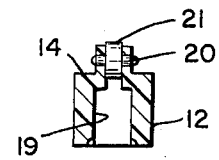
FIG. 3 is a cross-sectional view of the improved leader dispenser of FIG. 1 taken along the line 3—3 of FIG. 2.

Referring to FIG. 1 in conjunction with FIG. 2, FIG. 3, and FIG. 4, the improved leader 10 further includes an elongated, oblong slot 19, which is concentric with the oblong core 12, in the thick sidewall 15 of the double-sided flange 13 and an elongated oblong extrusion 20, which is concentric with the oblong core 12, and from the thin sidewall 14 of the double-sided flange 13. The oblong extrusion 20 slidably fits into the slot 19 and has a shimming member 21 in the oblong slot of the oblong extrusion 20 so that the oblong extrusion 20 fits snugly into the elongated oblong slot 19 of another improved leader dispenser 10.

Figure 5:
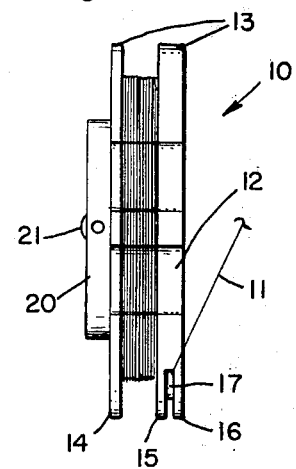
FIG. 5 is a rear elevational view of the improved leader dispenser of FIG. 1.
Figure 6:
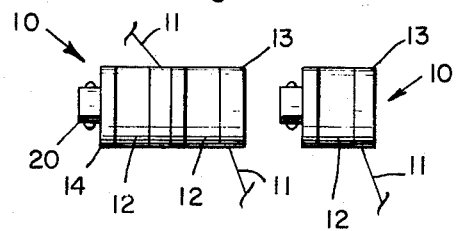
FIG. 6 is a top plan view of three improved leader dispensers of FIG. 1. The first two of which are mechanically coupled together and the third one of which is spaced apart from the first two.

Referring now to FIG. 5 in conjunction with FIG. 6 two improved leader dispensers 10 are joined together and a third leader dispenser 10 is about to be joined to the first two improved leader dispenser 10 in order to form a modular fishing leader dispensing system for dispensing different sizes of leader material. The elongated shape of the improved leader dispenser 10, especially when used in a modular fishing leader dispensing system, is very convenient for storing in a flat pocket of the shirt or jacket of a fisherman. The inventor believes that the fact that the improved leader dispenser is not cylindrical is one of the keys of his invention.

From the foregoing it can be seen that an improved leader dispenser has been described. Accordingly, it is intended that the foregoing disclosure and showing made in the drawing shall be considered only as illustrations of the present invention. Furthermore, it should be noted that the sketches are not drawn to scale and that distances of and between the figures are not to be considered significant. The invention is set forth with particularity in the appended claims.

What is claimed is:

1. An improved leader dispenser for storing and dispensing leader material comprising:
    a. leader receiving means for receiving the leader material which is wound onto said leader receiving means;
    b. securing means for securing one of the ends of the leader material mechanically coupled to said leader receiving means; and
    c. coupling means for coupling said improved leader dispenser to any one of a plurality of other identical said improved leader dispensers.

2. An improved leader dispenser according to claim 1 wherein said leader receiving means comprises an elongated, substantially rectangular member which has a first rounded end and a second rounded end, each of said ends being in the shape of a double-sided flange which has a thin sidewall and a thick sidewall and said coupling means comprises a longitudinal cavity within said elongated, substantially rectangular member on one of its sides and a protuberance, which is matched to said longitudinal cavity and disposed on the opposite side of said elongated, substantially rectangular member.

3. An improved leader dispenser according to claim 2 wherein said securing means comprises a spring which is embedded within said thick sidewall of said first round end and which is disposed orthogonally to said elongated, substantially rectangular member so that the end of the leader material may be secured within the coil of said spring.

4. An improved leader dispenser for storing and dispensing leader material comprising:
    a. an elongated, substantially rectangular member which has a first rounded end and a second rounded end, each of said ends being in the shape of a double-sided flange which has a thin sidewall and a thick sidewall whereby said elongated, substantially rectangular member receives the leader material which is wound onto said elongated, substantially rectangular member; and
    b. securing means for securing one of the ends of the leader material mechanically coupled to said elongated, substantially rectangular member.

5. An improved leader dispenser according to claim 4 wherein said securing means comprises:
    a. a spring which is embedded within said thick sidewall end of said first round end and which is disposed orthogonally to said elongated, substantially rectangular member so that the end of the leader material may be secured within the coil of said spring.

* * * * *